(12) United States Patent
Vanzandt et al.

(10) Patent No.: US 6,918,299 B2
(45) Date of Patent: Jul. 19, 2005

(54) METHOD AND APPARATUS FOR IMPROVING PERFORMANCE OF A FORCE BALANCE ACCELEROMETER BASED ON A SINGLE-COIL VELOCITY GEOPHONE

(76) Inventors: Thomas R. Vanzandt, 206 Ave. C, Redondo Beach, CA (US) 90277; Stephen J. Manion, 2231 Midlothian Dr., Altadena, CA (US) 91001

( * ) Notice: Subject to any disclaimer, the term of this patent is extended or adjusted under 35 U.S.C. 154(b) by 0 days.

(21) Appl. No.: 10/309,574

(22) Filed: Dec. 3, 2002

(65) Prior Publication Data

US 2003/0115959 A1 Jun. 26, 2003

Related U.S. Application Data

(63) Continuation of application No. 09/646,823, filed as application No. PCT/US99/06299 on Mar. 25, 1999, now abandoned.
(60) Provisional application No. 60/079,465, filed on Mar. 25, 1998.

(51) Int. Cl.⁷ .............................................. G01P 15/00
(52) U.S. Cl. .................................................. 73/514.17
(58) Field of Search ........................ 73/514.16, 514.17, 73/514.18, 514.21, 514.24, 514.31, 514.36, 514.38; 367/182

(56) References Cited

U.S. PATENT DOCUMENTS

| | | | |
|---|---|---|---|
| 2,162,455 A | 6/1939 | Hoge | 215/310 |
| 2,739,724 A | 3/1956 | Gora | 215/307 |
| 3,508,444 A | 4/1970 | Sitomer et al. | 73/514.17 |
| 3,589,545 A | 6/1971 | Carpenter, Jr. et al. | 215/260 |
| 3,641,414 A * | 2/1972 | Thompson et al. | 318/662 |
| 3,662,251 A | 5/1972 | Smith | 322/23 |
| 3,678,374 A | 7/1972 | Thompson | 340/870.37 |
| 3,877,314 A | 4/1975 | Bernin | 73/1.38 |
| 4,088,027 A | 5/1978 | Hernandez et al. | 73/514.21 |
| 4,121,728 A | 10/1978 | Tagalakis et al. | 215/260 |
| 4,185,235 A | 1/1980 | Schmidt | 318/677 |
| 4,190,170 A | 2/1980 | Boyd | 215/307 |
| 4,229,618 A | 10/1980 | Gamble | 381/96 |
| 4,242,741 A | 12/1980 | Parrish | 367/21 |
| 4,253,164 A | 2/1981 | Hall, Jr. | 367/22 |
| 4,335,611 A | 6/1982 | Bennett et al. | 73/514.19 |
| 4,344,235 A | 8/1982 | Flanders | 33/366.2 |

(Continued)

FOREIGN PATENT DOCUMENTS

EP 110431 A1 * 6/1984 ............ G01V/1/18

Primary Examiner—Hezron Williams
Assistant Examiner—Tamiko Bellamy
(74) Attorney, Agent, or Firm—Christie, Parker & Hale, LLP

(57) ABSTRACT

The invention concerns methods and apparatus for improving the performance of a force-balance accelerometer based upon a conventional, single-coil, velocity geophone. Specifically, the operating temperature range is increased through the use of both a temperature-compensating reference impedance, and a new electronic circuit architecture. Two specific types of temperature-compensating reference impedances are disclosed. One is a pure DC-resistance, with the temperature coefficient of the DC resistance matching that of a single coil of a conventional geophone. A second reference impedance adds a series reactance which closely matches the ratio of total impedance to DC-resistance, and the temperature coefficient of this ratio, with that of the geophone coil.

A method is also described which provides for decreased magnitude of a reference impedance required in an accelerometer. This allows for a significant reduction in the physical size of the reference impedance. The reduction in size reduces the physical size of the impedance and the sensitivity of the accelerometer to external time-varying magnetic fields.

14 Claims, 3 Drawing Sheets

U.S. PATENT DOCUMENTS

| | | | | |
|---|---|---|---|---|
| 4,538,203 A | * | 8/1985 | Flanner et al. | 361/159 |
| 4,598,835 A | | 7/1986 | Brownbill | 215/307 |
| 4,880,127 A | | 11/1989 | Doi | 215/252 |
| 4,891,983 A | | 1/1990 | Stewart | 73/514.17 |
| 5,033,028 A | | 7/1991 | Browning | 367/1 |
| 5,172,345 A | * | 12/1992 | van der Poel | 367/178 |
| 5,257,708 A | | 11/1993 | Dubach | 220/827 |
| 5,542,585 A | | 8/1996 | Peters et al. | 222/531 |
| 5,785,196 A | | 7/1998 | Montgomery | 215/354 |
| 5,789,677 A | | 8/1998 | McEachern | 73/514.19 |
| 5,803,286 A | | 9/1998 | Pfefferkorn et al. | 215/307 |
| 5,853,096 A | | 12/1998 | Bartur et al. | 215/261 |
| 6,075,754 A | * | 6/2000 | VanZandt et al. | 367/182 |

* cited by examiner

METHOD AND APPARATUS FOR IMPROVING PERFORMANCE OF A FORCE BALANCE ACCELEROMETER BASED ON A SINGLE-COIL VELOCITY GEOPHONE

CROSS-REFERENCE TO RELATED APPLICATIONS

This application is a continuation of U.S. application Ser. No. 09/646,823, filed Mar. 8, 2001, which application is the U.S. national phase application of PCT International Application PCT/US99/06299 filed Mar. 25, 1999, and published in English on Sep. 30, 1999 as International Publication No. WO 99/49324, which claims the benefit of the filing date of U.S. provisional application No. 60/079,465 filed Mar. 25, 1998, the disclosures of all of which are incorporated by reference.

BACKGROUND OF THE INVENTION

The invention relates generally to measurement of mechanical accelerations and more specifically to force balance accelerometers.

A conventional geophone involves a single coil and a magnet, both of which are contained in a housing. Springs support the coil, thus allowing motion in one dimension relative to the housing. The magnet is fixed with respect to the housing. The relative motion of the coil, in the magnetic field of the magnet, induces an electromotive force ("emf"), or voltage, in the coil. The coil is often a solenoid of finite length, in which a copper wire is wound circumferentially around a hollow, cylindrical, bobbin-form. By "single-coil," it is meant that a single, continuous length of wire has been wound into a coil, and that connection to the coil is available only at the two ends of the wire. Specifically, in a single-coil design, there is no access to electrical signals at any intermediate point within the coil. FIG. 1 of U.S. Pat. No. 5,119,345, the disclosure of which is incorporated by reference, provides a cutaway drawing of a typical, conventional, single-coil, velocity geophone. The voltage across these two terminals provides the output signal from the device. This voltage is proportional to the velocity of the housing for frequencies above the natural resonant frequency of the spring-coil-mass system. Because of this property, the conventional geophone is often referred to as a velocity geophone.

Many applications, however, require direct sensing of acceleration, rather than velocity. Seismic techniques for imaging the subsurface structure of the earth can generate improved data if sensors measure acceleration directly. To this end, methods for converting the conventional single-coil velocity geophone to an acceleration-sensitive transducer are important.

Heretofore, several electronic techniques have been proposed for converting a conventional, single-coil, velocity geophone to a force-balance accelerometer. These methods utilize the ability of a conventional geophone's coil and magnet to simultaneously function as a force actuator and as a relative velocity sensor. In this case, a force is applied to the coil in response to an electrical current passing through it. This force actuator can be used to counteract or balance the force applied to the coil by external accelerations of the geophone housing. In this case, the resultant relative velocity of the geophone coil with respect to the geophone housing can be reduced to near zero. In such a force-balance arrangement, the force applied by the coil-magnet actuator is controlled in such a way as to reduce the emf from the same coil-magnet velocity to near zero. When balanced in this way, the force applied by the coil-magnet actuator is proportional to the external accelerations applied to the geophone housing. In that the applied force is proportional to the current flowing through the coil, measurement of this current provides a signal also proportional to the acceleration applied to the geophone housing. The technique is known generally as force-balance feedback.

In such a technique, electronic feedback is applied to effectively terminate the coil of a conventional geophone with a negative terminating impedance. The effect of this is that a current is induced in the geophone coil in response to external accelerations. This current applies a force that counteracts or balances the force applied to the coil by the external accelerations. The result is a force-balance sensor in which the current flowing through the terminating impedance is proportional to the current flowing through the geophone coil, and hence, proportional to the external acceleration applied to the geophone.

SUMMARY OF THE INVENTION

The invention concerns methods for improving the performance of force-balance accelerometers, based-upon conventional, single-coil, velocity geophones. The improvements allow the operating temperature range of the accelerometer to be increased by improving the stability of the accelerometer with respect to temperature. The improvements allow for increased frequency response of the accelerometer. The methods also allow for a reduction in size and magnitude of the reference impedance used in these accelerometers. Through the use of these methods, the sensitivity of the accelerometer to external, time-varying magnetic fields can be reduced. With the proper choice of electronic components, such an acceleration-sensitive transducer (accelerometer) can be made to have a constant responsivity (output voltage per unit input acceleration) over a much larger frequency range than that of the velocity geophone from which it is made. Additional benefits include an increase in dynamic range (ratio of maximum measurable signal to minimum resolvable signal), and an increase in the linearity (insensitivity of responsivity to input acceleration level). These electronic techniques can be implemented in such a way that the self-noise (minimum resolvable signal) of the resulting accelerometer is nearly unchanged from that of the conventional geophone from which it is made.

It is an object of the invention to provide improvements to methods for converting a conventional, single-coil, velocity geophone to a force-balance accelerometer.

One object of the invention is to increase the operating temperature range over which the accelerometer will operate.

Another object of the invention is to reduce the temperature variation of the accelerometer's output responsivity.

Another object of the invention is to provide a method for reducing the volume and mass of the electrical components required in the accelerometer.

Another object of the invention is to reduce the sensitivity of the accelerometer to external, time-varying magnetic fields, by reducing the magnetic-field sensitivity of the reference impedance. This will also serve to reduce the inductive coupling between the geophone coil and the reference impedance, thereby improving the stability of the feedback control system.

The above objects can be attained simultaneously through the use of an improved electronic circuit, specific choices of component values within the feedback paths of the circuit, and temperature-compensating reference impedances.

The improved circuit architecture utilizes a single operational amplifier and derives its output voltage signal from the output of an operational amplifier (at the output of the feedback control system's forward path). With the proper choice of components in the feedback path, this reduces the magnitude of the temperature variation of the accelerometer's output responsivity. Specifically, the use of a feedback path whose transfer function magnitude is much less than unity provides that the output responsivity can be set by a temperature-insensitive impedance of value much larger than that of the geophone coil. This reduces significantly the contribution of the geophone coil impedance to the accelerometer's output responsivity, thereby reducing the temperature sensitivity of the accelerometer's responsivity.

The choice of components in the circuit's feedback path also allows for the use of a reference impedance whose magnitude is significantly smaller than that of the conventional geophone's single-coil. Specifically, the invention calls for a positive feedback path defined by one feedback resistance in series with a reference impedance, whose transfer function nearly matches that of a negative feedback path defined by a separate feedback impedance in series with the geophone coil. By reducing the value of the feedback impedance in the positive feedback loop, the magnitude of the reference impedance can be similarly reduced. This allows for a reduction in the volume and mass of the reference impedance. This also allows for a reduction in the sensitivity of the accelerometer to external, time-varying magnetic fields, and a reduction in the magnetic coupling between the reference impedance and the geophone coil.

One temperature compensating reference impedance consists of a resistor whose temperature coefficient of resistance is chosen to closely match that of the geophone's coil. This allows the ratio of $R_{DC}$ of the reference impedance to $R_{DC}$ of the geophone coil to remain constant over a wide temperature range. This allows for stable operation of the resulting accelerometer over a wide temperature range.

Another embodiment of the reference impedance adds to the above resistance a series reactance of such a value that the ratio of total impedance to $R_{DC}$: $(j\chi+R_{DC})/R_{DC}$ of the reference impedance nearly matches that of the geophone's coil. This increases the operating bandwidth of the accelerometer by increasing its responsivity at high frequency. The temperature coefficient of this series reactance is chosen to match that of the geophone's coil over a similarly wide temperature range. In this way, the temperature coefficient of the ratio: $(j\chi+R_{DC})/R_{DC}$ of the reference impedance, closely matches that of the geophone's coil. This also allows for stable operation of the resulting accelerometer over a wide temperature range.

Thus, one embodiment at present invention comprises a force balance accelerometer. The force balance accelerometer comprises a housing, a magnet producing a magnetic field within the housing, and a spring supporting a coil within the magnetic field. The coil has first and second terminals, the first terminal connected to a common. A second terminal is connected to an operational amplifier having a first amplifier input, a second amplifier input, and an amplifier output. The first amplifier input is coupled to a second terminal of the coil and a first feedback path. Similarly, the second amplifier input is coupled to a reference impedance and a second feedback path. The reference impedance has a reactance, namely a reactive component of impedance. In another embodiment, the present invention comprises a single coil geophone, having two terminals. A force actuator is coupled to at least one of the two terminals, and the force actuator includes a single amplifier stage and the reference impedance coupled to the single amplifier stage. Tile reference impedance has a reactive component. In another embodiment of the invention, a force balance accelerometer comprises a housing, means for providing a magnetic field in the housing, and a coil moveably supported in the magnetic field. In addition, means for generating a current is coupled to the coil, the means for generating a current including means for comparing a reference voltage generated across a reference impedance to a voltage generated across the coil.

Many of the attendant features of this invention will be more readily appreciated as the same becomes better understood by reference to the following detailed description considered in connection with the accompanying drawings.

DETAILED DESCRIPTION OF THE INVENTION

Figure 1:
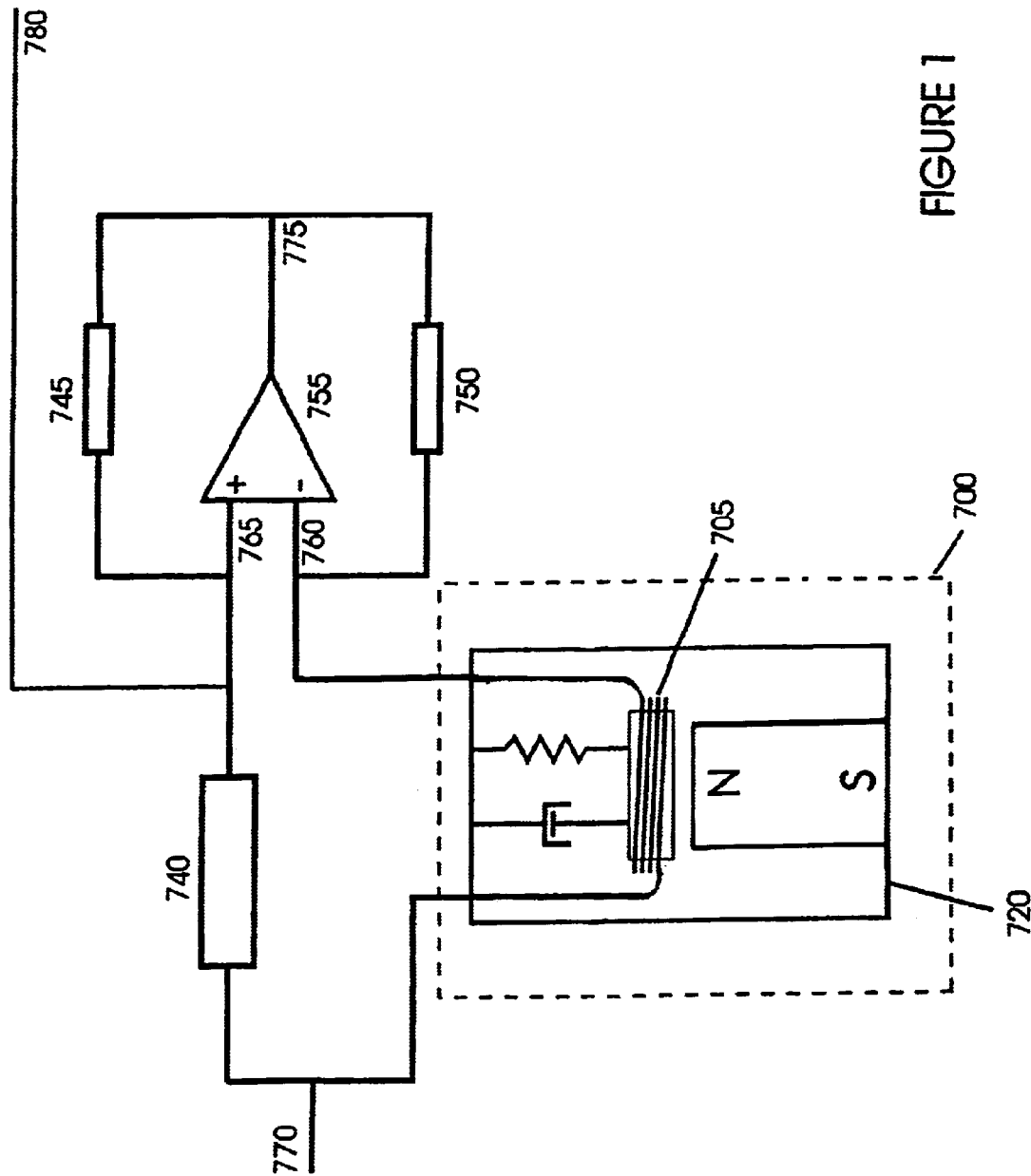
FIG. 1 illustrates a black diagram of a force-balance accelerometer.

FIG. 1 shows one electronic architecture for converting a conventional geophone to an acceleration-sensitive transducer. In FIG. 1, a coil 705 of a conventional, single-coil geophone 700 is connected between an inverting input 760 of an operational amplifier 755 and a common 770. A reference impedance 740 is connected between a non-inverting input 765 of the operational amplifier, and the common. Components 745 and 750 are typically resistors. In this simple configuration, the negative feedback (from 775 to 760) nearly matches the positive feedback (from 775 to 765).

The complex transfer functions associated with the negative feedback path (775 to 760) and the positive feedback path (775 to 765), in conjunction with the open loop transfer function of the amplifier 755, determine the stability of the control system. Stability, in this case, refers to the absence of spontaneous oscillation or large DC offset at the output of the accelerometer in the absence of any significant input acceleration. In most cases, stability will be ensured if the magnitude of the negative feedback path's transfer function is larger than the magnitude of the positive feedback path's transfer function. If the magnitudes are nearly equal (with the negative feedback magnitude slightly larger, as required for stability), then the current flowing through the geophone's single-coil 705 will provide a force to the mass of that coil that is nearly proportional to the external acceleration applied to the geophone's housing 720. The voltage appearing across this coil can serve as a proxy for this current. More commonly, the voltage appearing across the reference impedance 740 relative to the common 760 is used as an output signal for the device 780. The caveat to this latter practice is that any frequency dependence of the reference impedance will introduce a frequency dependence to the output responsivity of the accelerometer. Similarly, any temperature dependence of this reference impedance will introduce a temperature dependence to the output responsivity of the accelerometer. As it is desired to have as constant a response over frequency and temperature as is possible, the method for measuring this feedback current should not introduce either unwanted frequency or temperature dependence. Ideally, this method should be as simple as possible, without significantly increasing the cost or power consumption of the electronics significantly.

It is important to stress that it is the negative feedback path's complex transfer function relative to the positive feedback path's complex transfer function that largely determines stability of the feedback system. In the example of FIG. 1, the positive feedback path's transfer function is defined by the voltage divider formed by impedances 745 and 740. Similarly, the negative feedback path's transfer function is defined by the voltage divider formed by impedances 750 and 705 (geophone coil). Typically, impedances 745 and 750 will be fixed (largely invariant over time and temperature). Therefore, variations in the positive feedback and negative feedback path transfer functions will come solely from variations in the reference and geophone coil impedances, respectively. In order to simplify the following discussions, we will assume that impedances 745 and 750 are identical (as well as invariant). In this case, matching of the positive and negative feedback path transfer functions, will be tantamount to matching of the reference and geophone coil impedances, respectively.

Assuming that impedances 745 and 750 are identical, stability of the feedback system requires that the magnitude of the impedance of the geophone coil be greater than that of the reference impedance. This ensures that the negative feedback path's transfer function magnitude is greater than the positive feedback path's transfer function magnitude, as is required for stability. Again, assuming that impedances 745 and 750 are identical, the matching (or equivalence) of the reference impedance 740 to the impedance of the conventional geophone's single-coil 705 has a strong influence on the frequency response of the resulting accelerometer.

Figure 2:
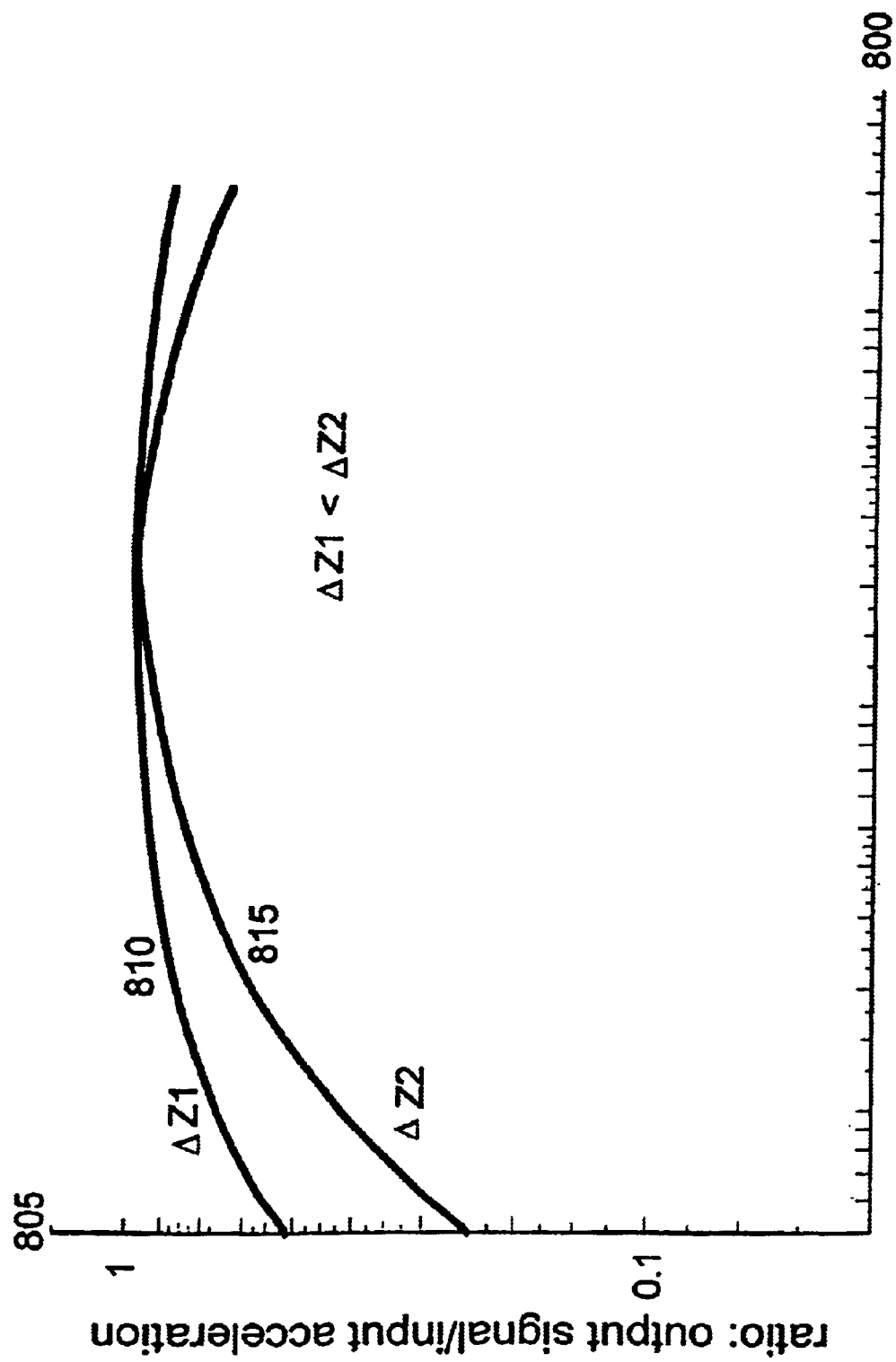
FIG. 2 shows a graph of the ratio of output signal over input acceleration with respect to frequency for two sets of impedances.

FIG. 2 shows the ratio of indicated acceleration (from the output signal), to input acceleration, for a finite mismatch in impedance, $\Delta Z$, between the coil and reference. In this graph, the ratio of output signal to input acceleration is plotted on the vertical axis 805 as a function of frequency on the x-axis 800. FIG. 2 shows that the responsivity falls off at both high and low frequency as a result of a finite impedance mismatch. The frequency width between the low and high frequency roll-offs (i.e., the bandwidth) is reduced with a larger impedance mismatch.

This simple derivation illustrates that the use of a larger impedance mismatch (lower curve 815 corresponding to $\Delta Z2$) leads to a smaller sensor bandwidth. In a conventional, single-coil, velocity geophone, the complex coil impedance consists of a DC resistance ($R_{DC}$) in series with a reactance ($\chi$). At low frequency, magnitude of the coil impedance is dominated by the $R_{DC}$, while at higher frequency the magnitude of the impedance is influenced by the coil reactance. Because of this, the accelerometer's low frequency response is most strongly influenced by the matching between the geophone coil's $R_{DC}$ and the $R_{DC}$ of the reference. At high frequency, however, the geophone coil's reactance influences the accelerometer's frequency response.

Typically, the magnitude of the total impedance of the coil increases at moderately high frequency, as the coil's reactance adds to its DC resistance. Typically this increase begins at frequencies above 100 Hz. If this increase in geophone coil impedance leads to a significant mismatch with respect to the reference impedance, then the accelerometer's response will fall off at higher frequencies. It is important, then, for the electronic circuit's reference impedance to match this coil reactance, if the accelerometer is to provide acceptable high frequency response. Typically, the magnitudes of the coil and reference impedance must be made to match to within a few percent.

Matching of the geophone coil impedance to that of the reference should be maintained over a wide range of ambient temperatures. Large applications of sensors of this type, for example in seismic imaging of the substructure of the earth, require that the sensors operate over a temperature range of $-50°$ C. to $+60°$ C. Conventional geophones utilize coils wound with copper wire. The intrinsic temperature coefficient of resistance (TCR, defined as a percentage change of a resistance value per unit change in temperature) of copper is approximately $+0.4\%/°$ C. Over this range of temperatures, the geophone coil's $R_{DC}$ will vary by up to 45%. If this variation is not tracked by the reference impedance, to within the design requirement (e.g., the variation must remain below a few percent of the nominal $R_{DC}$ of the geophone coil), then the performance of the accelerometer may be adversely affected (e.g., frequency response may vary significantly from its nominal value). At one extreme, the temperature effects may cause the reference impedance to become greater than the impedance of the geophone's coil. In this case, the electronic feedback circuit will become unstable. The geophone coil reactance will also vary, but by a smaller amount, dictated largely by the thermal expansion of the coil. The inductance variation over the full temperature span is typically in the range of 0.1 to 0.5%. Matching of this inductive reactance between the geophone's single-coil and the reference impedance is important in applications where significant sensor response at high frequency is required.

If the geophone coil and reference impedance have significant electrical coupling, then the relative magnitudes of the positive and negative feedback path transfer functions may be modified. A specific problem is mutual inductance between the geophone coil and reference impedance, which, if too large, may cause an unwanted positive feedback path that causes the feedback control system to be unstable. Minimization of the electrical coupling between the geophone coil and the reference impedance is desirable. Such coupling is often associated with significant levels of sensitivity to external, time-varying magnetic fields. Minimizing the sensitivity of the accelerometer to such fields is also important.

In many applications it is important that the volume and mass of the complete seismic accelerometer be as small as possible. Therefore, the electronic circuit should add as little volume and mass as possible above that of the conventional geophone, from which the sensor is made. Components that are capable of matching both the $R_{DC}$ (~4000 Ohms) and reactance (typically 250 mH inductance) of the geophone coil, over temperature, are typically large in size. In view of this, techniques for reducing the volume and mass of the reference impedance are important.

Figure 3:
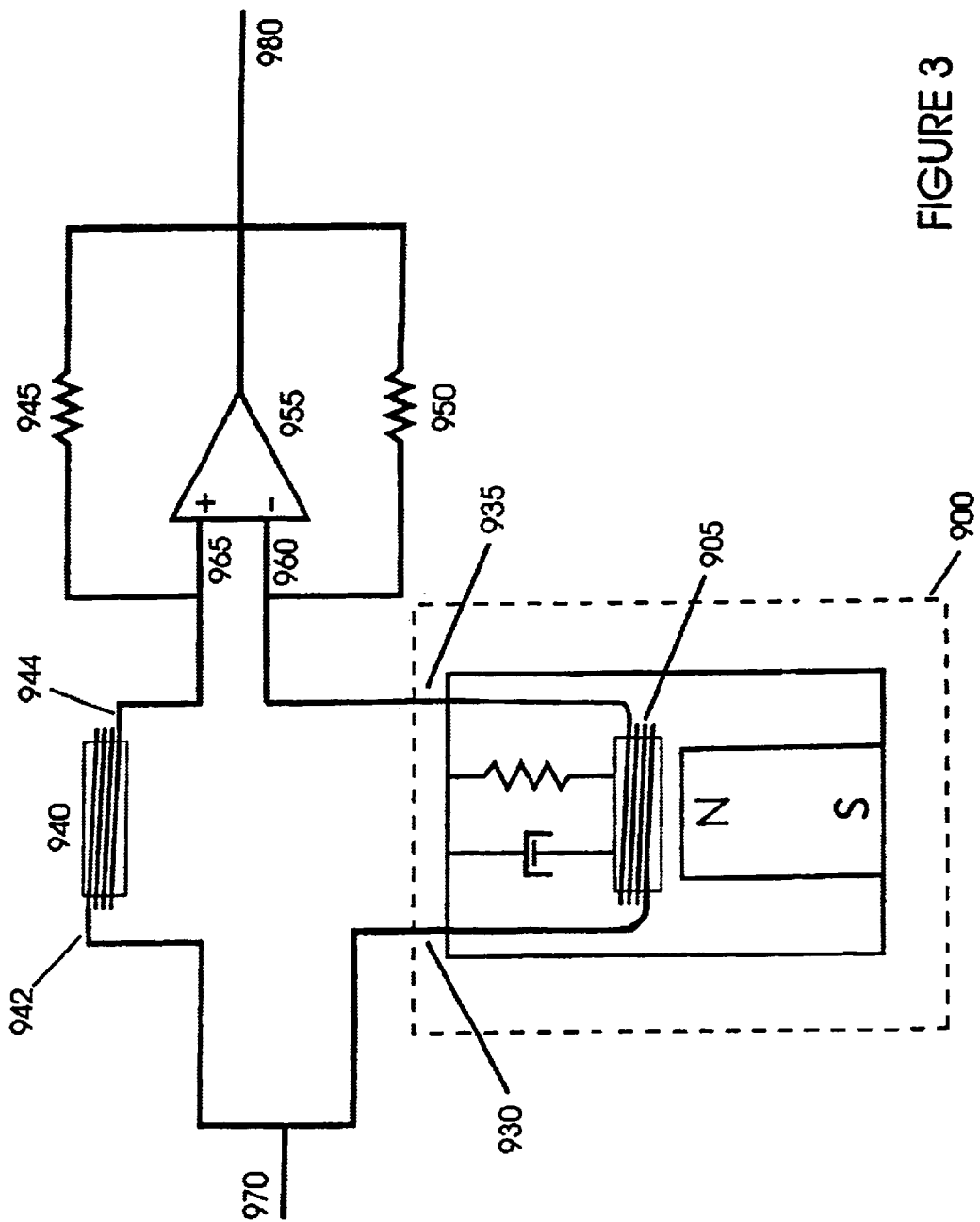
FIG. 3 illustrates a schematic of a further force-balance accelerometer.

FIG. 3 provides a description of an electronic circuit architecture of the invention. The terminals 930 and 935 of a conventional geophone 900 are connected between the inverting input 960 of an operational amplifier 955 and a common 970. The terminals 942 and 944 of reference impedance 940 are connected between the non-inverting input 965 of the same amplifier, and the same common. The output 980 of the amplifier is connected back to the inverting input through impedance 950 and back to the non-inverting input through impedance 945. These two connections provide a negative and positive feedback path, respectively. The output 980 of the amplifier provides the output signal from the accelerometer. The voltage at 965 is defined by the output voltage at 980 and the transfer function of the voltage divider formed by a positive feedback impedance 945 and the reference impedance 940. Because it feeds the positive (non-inverting) input of the amplifier, it provides positive feedback. The positive feedback path transfer function is given by $Z_{940}/(Z_{940}+Z_{945})$, where Z represents the impedance of each element. The voltage at 960 is defined by the output voltage at 980 and the transfer function of the voltage divider formed by a negative feedback impedance 950 and the geophone's coil impedance 905. Because it feeds the negative (inverting) input of the amplifier, it provides negative feedback. The negative feedback path transfer function is given by $Z_{905}/(Z_{905}+Z_{950})$. Most typically, stability of this feedback circuit requires that the magnitude of the negative feedback path's transfer function be greater than the magnitude of the positive feedback path's transfer function. Acceptable performance (e.g., wide bandwidth and high linearity) of the resulting accelerometer requires that these transfer functions be as closely matched as possible. This provides, for example, the widest bandwidth in the resulting accelerometer. In the preferred embodiment, typically these transfer functions are matched to within a few percent, with the negative path transfer function being a few percent larger than that of the positive path to achieve stability. The transfer functions can be re-written as $(1+Z_{945}/Z_{940})^{-1}$ for the positive path and $(1+Z_{950}/Z_{905})^{-1}$ for the negative path. In view of this, matching of the transfer functions typically requires matching of the ratio $Z_{945}/Z_{940}$ to the ratio $Z_{950}/Z_{905}$, to within a few percent. Typically, $Z_{950}/Z_{905}$ is set approximately a few percent smaller for stability of the control system.

In the preferred embodiment, the magnitude of both transfer functions is significantly less than unity over the accelerometer's normal bandwidth. Typically the magnitude is 0.1 or less. For this to be the case the value of impedance 950 must be much greater than the coil impedance 905, and the value of impedance 945 must be much greater than the reference impedance 940. In the preferred embodiment, the impedances 945 and 950 are both resistors, whose impedances are constant with frequency. Also, the impedances are chosen to have a small temperature dependence, relative to the temperature dependence of either 940 or 905. The signal output from the device 980 is defined (relative to the common 970) by the product of the feedback current flowing through the geophone coil 905 and the sum of impedances 905 and 950. Because the value of 950 is much larger than 905, the output responsivity of the device is largely determined by the value of impedance 950. Because impedance 950 is chosen to have a small temperature dependence, the output responsivity of the accelerometer will similarly have a small temperature dependence. Typically, with this preferred circuit architecture, the temperature dependence of the responsivity of the accelerometer can be reduced by about a factor of 10. If necessary, the temperature dependence could be reduced even further by measuring the differential voltage across either impedance 945 or 950. Specifically, one would measure the differential voltage between nodes 965 and 980 or between 960 and 980. As both of these impedances are chosen to be essentially temperature invariant, either voltage will provide a temperature-independent measure of the feedback current, and hence acceleration.

In one embodiment, the reference impedance is formed from the same material (typically copper) as the geophone coil. This provides that the temperature coefficient of resistance of the reference impedance matches that of the geophone coil In one embodiment, the reference impedance 940 is a pure resistance. The reference impedance is formed so that the ratio of its $R_{DC}$ to the DC-resistance of impedance 945 nearly matches the ratio of the $R_{DC}$ of the geophone coil impedance 905 to the DC-resistance of impedance 950. Typically the resistance ratio corresponding to the reference side is chosen to be a few percent less than the ratio corresponding to the geophone coil, to ensure stability of the control system. Because the reference is formed out of the same material as the geophone coil, these ratios track one another over wide temperature extremes. Because impedances 945 and 950 are chosen to have a small temperature coefficient of resistance, this is equivalent to saying that the ratio of $R_{DC}$ of the reference impedance 940 to that of the geophone coil 905 is invariant over temperature. The reference impedance is formed in such a way that its series inductance is very small. One preferred fabrication method includes winding of a solenoid coil of copper wire on a cylindrical bobbin, such that the resulting coil consists of equal numbers of overlapping turns of clockwise and counter-clockwise wound wire in order to minimize the series inductance of the reference. Use of such a reference impedance typically leads to an accelerometer with a constant output response over a bandwidth between 3 and 150 Hz. At high frequency, the response of the accelerometer drops because the series inductance of the geophone coil 905 is not suitably matched by this reference.

In another embodiment, the reference impedance 940 is formed to be a reactance (of value $\chi$) in series with a resistance. The impedance of the reference impedance 940 is therefore $j\chi+R_{DC}$. The reference impedance 940 is again formed so that the ratio of its $R_{DC}$ to the $R_{DC}$ of impedance 945 nearly matches the ratio of the $R_{DC}$ of the geophone coil impedance 905 to the $R_{DC}$ of impedance 950. Typically the resistance ratio corresponding to the reference side is chosen to be a few percent less than the ratio corresponding to the geophone coil, to ensure stability of the control system. Because the reference impedance is formed out of the same material as the geophone coil, these ratios track one another over wide temperature extremes. A second attribute is that the ratio of total impedance to $R_{DC}$:$(j\chi+R_{DC})/R_{DC}$ of the reference nearly matches the same ratio in the geophone coil. Typically, the ratio $(j\chi+R_{DC})/R_{DC}$ for the reference side is chosen to be a few percent less than that of the geophone coil, in order to ensure stability at higher frequency. The reactance is formed in such a way that its temperature coefficient of reactance matches that of the geophone coil. This provides that the ratio $(j\chi+R_{DC})/R_{DC}$ for the reference impedance tracks that of the geophone coil over wide temperature extremes. Matching of the temperature coefficients of both $R_{DC}$ and $(j\chi+R_{DC})/R_{DC}$ between the reference impedance and the geophone coil provides for stability of the control system over wide temperature extremes.

One preferred fabrication method involves winding a coil of wire (of the same material as the geophone coil) on a bobbin, so that the resulting coil has the proper values of $R_{DC}$ and $\chi$. This is accomplished simply through a choice of both the bobbin geometry and the diameter of the wire. The bobbin material is chosen so that its thermal coefficient of expansion closely matches that of the bobbin on which the geophone coil is wound. One preferred embodiment of the reference impedance duplicates precisely the coil contained in the geophone. It matches the geometry and material of the geophone's coil form, any magnetically permeable materials in and around the coil, and the cross-sectional diameter of the wire as precisely as possible. Typically, the number of turns of wire in the reference is adjusted slightly to provide the values of $R_{DC}$ and $(j\chi+R_{DC})/R_{DC}$ required for stability.

An alternative embodiment for adjustment of these values is the addition of a separate, small resistance (typically a few percent of $R_{DC}$) in series with either the geophone, or the reference impedance, as required for stability of the control system. This latter approach allows the use of a second, identical geophone in which the spring-supported coil is pinned rigidly to the geophone housing, as the reference impedance. This type of reference will nearly exactly match both $R_{DC}$ and $(j\chi+R_{DC})/R_{DC}$ of the geophone coil (to within approximately 1%) In this case, the shorting connection between one geophone terminal 930 and the common 970 will be replaced by a small resistance. The value of this separate resistor will be set at approximately a few percent of the $R_{DC}$ of the geophone coil 905. This trimming will allow for stability of the feedback control system. Because it provides closer matching of the positive and negative feedback path transfer functions at high frequency, the use of a reactive reference of either of the types described, allows the responsivity of the accelerometer to remain constant over a wider bandwidth, typically 3 to 350 Hz.

In another embodiment of the invention, the positive feedback impedance 945 is smaller than the negative feedback impedance 950 by some factor. In this case, the value of reference impedance 940 will be smaller than the value of the geophone coil impedance 905 by the same factor in order to maintain the required ratio for stability. Typically this reduction factor can be greater than or equal to 10. In this embodiment, both the reactance and DC-resistance of the reference impedance are reduced by this factor. In that this reactance is primarily inductive, reducing the reactance allows the reference impedance to be made physically smaller. Typically, reducing the reference reactance by a factor of 10 reduces the volume and mass of the reference impedance by an approximate factor of 10. This allows the volume and mass of the resulting accelerometer to be reduced significantly.

This reduction in size of the reference impedance also reduces its sensitivity to external, time-varying magnetic fields. For the solenoid-type reference coil of the preferred embodiment, external fields generate an unwanted emf, whose amplitude is proportional to the inductance of the reference. Reducing the value of this inductance in the reference reduces the size of the emf by a corresponding factor. The coupling between the reference impedance and the geophone coil is reduced by a similar factor.

In another embodiment, the reduced value reference impedance is fabricated as a copper wire coil wound on a bobbin-form that has a smaller cross-sectional area than that of the geophone coil. The bobbin-core material of the reference is chosen to be the same material as that of the geophone coil. This ensures that the temperature coefficient of inductance of the reference matches that of the geophone coil. The copper wire size (cross-section area) and the number of turns of the reference coil are chosen so that the $(j\chi+R_{DC})/R_{DC}$ ratio appropriately matches that of the geophone coil and that the ratio of positive feedback DC-resistance (of 945) to that of the reference coil appropriately matches the ratio of the negative feedback DC-resistance (of 950) to that of the geophone coil, as required for stability of the feedback control system.

Accordingly, the present invention provides an improved force balance accelerometer. Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents rather than the foregoing description.

What is claimed is:

1. A force balance accelerometer comprising:
a housing;
a magnet producing a magnetic field within the housing;
a spring supporting a coil within the magnetic field, the coil having first and second terminals, with the first terminal connected to a common;
an operational amplifier having a first amplifier input, a second amplifier input, and an amplifier output, the first amplifier input being coupled to the second terminal of the coil and a first feedback path, and the second amplifier input being coupled to a reference impedance and a second feedback path, the reference impedance having a reactive component of impedance.

2. The force balance accelerometer of claim 1 wherein the coil has a complex impedance of a direct current resistance plus a reactance, and the reactive component of the reference impedance substantially matches the reactance of the complex impedance of the coil.

3. The force balance accelerometer of claim 2 wherein the reference impedance has a resistive component substantially matching the direct current resistance of the coil.

4. The force balance accelerometer of claim 3 wherein the reference impedance comprises a second coil.

5. The force balance accelerometer of claim 4 wherein the second coil has a temperature coefficient of impedance substantially equivalent to that of the coil.

6. The force balance accelerometer of claim 3 wherein the reference impedance comprises a second coil and a resistor.

7. The force balance accelerometer of claim 3 wherein the first feedback path includes a first resistor, the second feedback path includes a second resistor, and the first and second resistor have substantially equivalent resistances.

8. The force balance accelerometer of claim 7 wherein the first feedback path and the second feedback path each have an associated transfer function, the magnitudes of which are less than unity over a predefined bandwidth of frequencies.

9. The force balance accelerometer of claim 8 wherein the resistances of the first and second resistors are substantially greater than the impedances of the coil and the reference impedance over the predefined bandwidth of frequencies.

10. A force balance accelerometer comprising:
a single coil geophone having two terminals;
a force actuator coupled to at least one of the two terminals, the force actuator having a single amplifier stage and including a reference impedance comprising a reference coil having a reactive component coupled to the single amplifier stage.

11. The force balance accelerometer of claim 10 wherein the reference impedance comprises the reference coil and a reference resistor.

12. The force balance accelerometer of claim 11 wherein the reference coil and the reference resistor are connected in series.

13. The force balance accelerometer of claim 12 wherein the reference coil and the reference resistor have substantially similar variations in impedance with temperature.

14. A force balance accelerometer comprising:
a housing;
means for providing a magnetic field in the housing;
a coil movably supported in the magnetic field;
means for generating a current coupled to the coil, the means for generating a current including means for comparing a reference voltage generated across a reference impedance to a voltage generated across the coil, the reference impedance including a reference coil having a reactive component.

* * * * *